(12) United States Patent
Billman

(10) Patent No.: US 8,023,536 B1
(45) Date of Patent: Sep. 20, 2011

(54) WEAPON SYSTEM AND METHOD FOR BEAM CONTAINMENT AND BEAMWALK MAINTENANCE UTILIZING OPTICAL FIBERS

(75) Inventor: Kenneth W. Billman, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 985 days.

(21) Appl. No.: 11/937,452

(22) Filed: Nov. 8, 2007

Related U.S. Application Data

(63) Continuation-in-part of application No. 10/851,168, filed on May 24, 2004, now abandoned.

(51) Int. Cl.
*H01S 3/30* (2006.01)
(52) U.S. Cl. .................... 372/4; 372/9; 372/34; 372/108
(58) Field of Classification Search ................... 372/4, 9, 372/34
See application file for complete search history.

(56) References Cited

U.S. PATENT DOCUMENTS

| | | | |
|---|---|---|---|
| 4,784,454 | A | 11/1988 | Dyott |
| 5,663,975 | A | 9/1997 | Yoshida et al. |
| 5,734,504 | A | 3/1998 | Billman |
| 2001/0043772 | A1 | 11/2001 | Sorin |
| 2002/0131470 | A1 | 9/2002 | Eggleton et al. |
| 2003/0100824 | A1 | 5/2003 | Warren et al. |
| 2003/0161583 | A1 | 8/2003 | Kuhara |
| 2006/0292808 | A1 | 12/2006 | Autryve et al. |

OTHER PUBLICATIONS

"Nonlinear Photonic Crystal Fibers",<http://www.crystal-fibre.com/> (visited Mar. 20, 2004) (1 page).
"Double Claddinf Active Fibers", <http://www.crystal-fibre.com/> (visited Mar. 20, 2004) (1 page).
"Air-Guiding Fibers", <http://www.crystal-fibre.com/> (visited Mar. 20, 2004) (1 page).
"High NA Fibers", <http://www.crystal-fibre.com/> (visited Mar. 20, 2004) (1 page).
"Large Mode Area Fibers", <http://www.crystal-fibre.com/> (visited Mar. 20, 2004) (1 page).
"Custom Fiber Products", <http://www.crystal-fibre.com/> (visited Mar. 20, 2004) (1 page).
Crystal Fibre product specifications, Crystal Fibre A/S, 2003, Denmark, (5 pages).
"Tutorial—High Index Guiding Fibers", <http://www.crystal-fibre.com/technology/tutorial/tutorial2_text.htm> (visited Mar. 20, 2004 (2 pages).
"Tutorial—The Bandgap Effect", < http://www.crystal-fibre.com/technology/tutorial/tutorial3_text.htm> (visited Mar. 20, 2004 (2 pages). "Technology—Air Guiding Fibers", < http://www.crystal-fibre.com/technology/tutorial/tutorial4_text.htm> (visited Mar. 20, 2004 (2 pages).

*Primary Examiner* — Dung Nguyen
(74) *Attorney, Agent, or Firm* — McDermott Will & Emery LLP

(57) ABSTRACT

A weapon system includes a weapon system illuminator laser system and one or more optical fibers. The weapon system illuminator laser system can produce one or more illuminator laser beams to illuminate at least one object outside the weapon system without destroying the object. The weapon system illuminator laser system is located at a first location within the weapon system. The object, or a second object associated with the object, is to be destroyed or damaged by energy. The one or more optical fibers are configured to transport the one or more illuminator laser beams from the first location to a second location within the weapon system. The one or more optical fibers can provide beam containment and beamwalk maintenance in the presence of mechanical or thermal disturbances. The one or more optical fibers and the weapon system illuminator laser system can withstand mechanical or thermal disturbances.

20 Claims, 10 Drawing Sheets

STEP-INDEX FIBER
CLADDING
CORE

PHOTONIC CRYSTAL FIBER
AIR
PURE SILICA

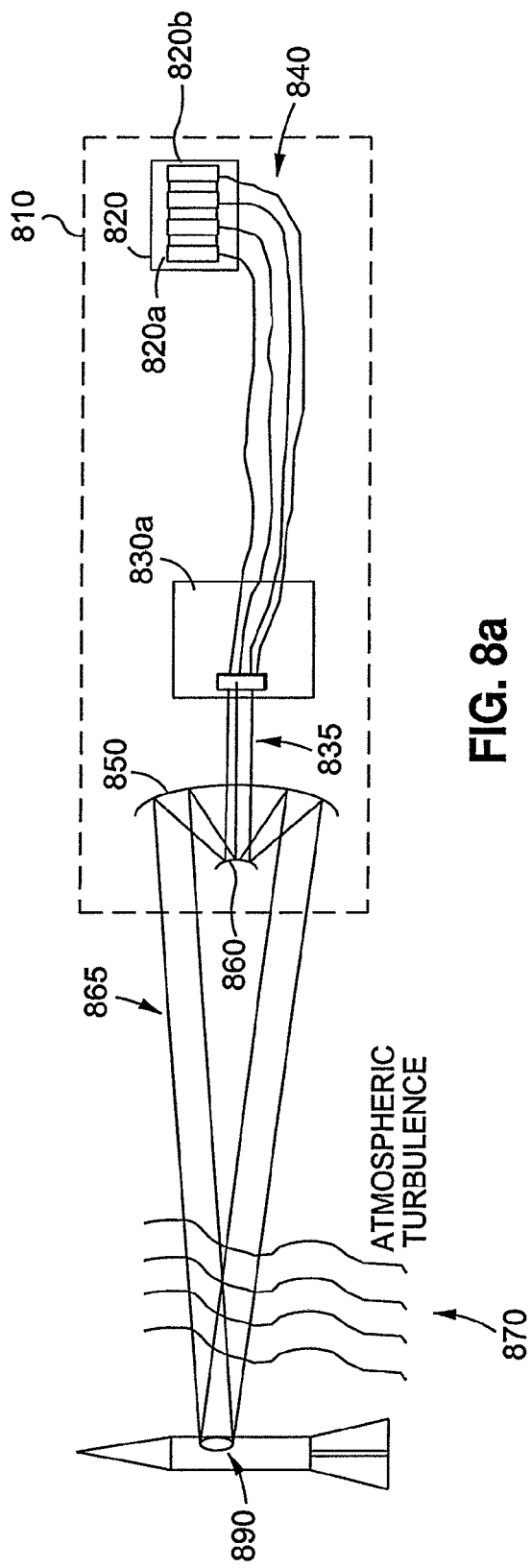
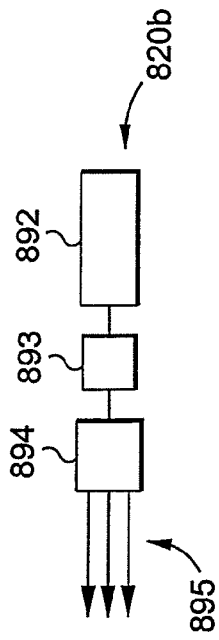
FIG. 8a
FIG. 8b

WEAPON SYSTEM AND METHOD FOR BEAM CONTAINMENT AND BEAMWALK MAINTENANCE UTILIZING OPTICAL FIBERS

CROSS-REFERENCE TO RELATED APPLICATION

This is a continuation-in-part of U.S. patent application Ser. No. 10/851,168 entitled "SYSTEM AND APPARATUS FOR BEAM CONTAINMENT AND BEAM WALK MAINTENANCE FOR HIGH POWER LASER BEAMS UTILIZING OPTICAL FIBERS," filed on May 24, 2004, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

1. Field

The present invention relates generally to weapon systems and methods, and more particularly to weapon systems and methods for beam containment and beamwalk maintenance utilizing optical fibers.

2. Background

Currently, the state-of-the-art approach to the problem of line-of-sight beam alignment for airborne laser systems is various active beamwalk alignment or maintenance systems that comprise a set of active beamwalk mirrors controlled by complicated electro-servo mechanisms. FIG. 1 illustrates one such beamwalk maintenance system for an Airborne Laser System. As shown in FIG. 1, the beams of a high power Track Illuminator (TILL) laser (110) and of a high power Beacon Illuminator (BILL) laser (120) are sent from the Multi-Beam Illuminator (MBIL) Bench (130) to the Beam Transfer Assembly (BTA) Bench (140) in a stable fashion. The two benches have considerable separation, and the benches tilt relative to each other. The beamwalk maintenance system shown in FIG. 1 employs active or movable Beamwalk Mirrors (BWM's) to maintain line-of-sight beam alignment for TILL and BILL lasers despite the relative movement of the optical benches. A pair of Beamwalk Mirrors (BWM's) are used for each laser—BWMs #5 and #6 for the BILL, and BWMs #7 and #8 for the TILL laser. To describe briefly, the first BWM of each pair tilts to center their beams onto the second mirrors, and the second mirrors then tilt to adjust the directions of the beams leaving them so that they center on the steering mirrors. The mirrors are actuated by voice-coil servo mechanism with control electronics. The control signals for these voice-coil-driven BMWs are derived from the beam walk sensors (160) which are sensitive to the centroids and angular directions of the beams coming from the beamwalk laser source (170) that are back-propagated through the same mirror systems. Thus, if any of the illuminator beams wander or "walk" off-center at the steering mirrors, the beamwalk laser beams arriving at the beamwalk sensors (160) also fall off-center, producing feedback signals, which are then processed by a processor to generate the control signals to the voice-coil-driven BMWs to actuate the mirrors to correct the beamwalk.

Although effective within their operational parameters, the current state-of-the-art beamwalk maintenance systems based on active beamwalk mirrors suffer from several shortcomings. One of the problems is that the beamwalk mirror systems cannot handle large disturbances due to the limited range of movements of the mirrors and limited range of alignment operation that can be accomplished with a system of mirrors. Another problem is what is known as residual jitter. Although the feedback control systems for the beamwalk mirrors are driven by light (laser) and electronics, the system has finite, nonzero response time. This means that small beamwalks that occur before the mirror systems have a chance to respond cannot be corrected, and, as a result, beamwalk mirror systems have inherently uncorrectable residual jitter corresponding to their system response time.

Other problems are related to the complexity of the active beamwalk mirror systems. As described above, the active mirror based beamwalk maintenance systems are delicate systems with a large number of parts. As well known in system engineering arts, the larger the number of parts, the greater the frequency of system failures, resulting from the failures of one or more parts. Such comparatively high failure rate is particularly problematic for laser systems deployed in difficult-to-service environments, such as the Space Based Laser (SBL).

It can be seen, then, there is a need in the field for a simpler beamwalk maintenance system that can handle large platform disturbances and has zero residual jitter.

SUMMARY OF THE INVENTION

The present invention provides weapon systems and methods for beam containment and beamwalk maintenance utilizing optical fibers. According to one aspect of the invention, the present invention affords a vastly improved and simplified beam containment and beamwalk maintenance system and apparatus utilizing optical fibers, which are rigidly attached to or "clamped" to optical benches. Because the laser beams are contained within optical fibers, the line-of-sight alignment of the laser beams is maintained without complex system of active mirrors and control electronics. Relative bench and laser motions, as well as the drift of the beams for any reason have no effect on the directions of the fiber output beams, since they are determined simply by the fiber ends that are securely fastened to the optical benches.

According to one aspect of the invention, a weapon system comprises a weapon system illuminator laser system and one or more optical fibers. The weapon system illuminator laser system is configured to produce one or more weapon system illuminator laser beams to illuminate at least one object outside the weapon system without destroying the at least one object. The weapon system illuminator laser system is located at a first location within the weapon system. The at least one object or a second object associated with the at least one object is to be destroyed or damaged by an energy force.

The one or more optical fibers are coupled to the weapon system illuminator laser system. The one or more optical fibers are configured to transport the one or more weapon system illuminator laser beams from the first location to a second location within the weapon system. The one or more optical fibers are configured to provide beam containment and beamwalk maintenance in the presence of mechanical or thermal disturbances. The one or more optical fibers and the weapon system illuminator laser system are configured to withstand mechanical or thermal disturbances.

According to another aspect of the invention, a method utilized by a weapon system is provided. The method comprises: generating, by a weapon system illuminator laser system, one or more weapon system illuminator laser beams to illuminate at least one object outside the weapon system without destroying the at least one object; and transporting, by one or more optical fibers, the one or more weapon system illuminator laser beams from a first location to a second location within the weapon system. The weapon system illuminator laser system is located at the first location within the weapon system. The at least one object or a second object associated with the at least one object is to be destroyed or damaged by an energy force. The step of transporting comprises providing beam containment and beamwalk maintenance in the presence of mechanical or thermal disturbances. The method further comprises withstanding mechanical or thermal disturbances by the one or more optical fibers and the weapon system illuminator laser system.

It is understood that various configurations of the present invention will become readily apparent to those skilled in the art from the following detailed description, wherein various configurations of the present invention are shown and described by way of illustration. As will be realized, the present invention is capable of other and different configurations and its several details are capable of modification in various other respects, all without departing from the scope of the present invention. Accordingly, the drawings and detailed description are to be regarded as illustrative in nature and not as restrictive.

BRIEF DESCRIPTION OF THE DRAWINGS

Referring now to the drawings in which like reference numbers represent corresponding parts throughout:

FIG. 8a illustrates an exemplary weapon system for beam containment and beamwalk maintenance according to one aspect of the present invention;

FIG. 8b illustrates an exemplary multi-beam weapon system illuminator laser;

DETAILED DESCRIPTION OF THE INVENTION

According to various aspects of the present invention, a beam containment and beamwalk maintenance system utilizing optical fibers provides several advantages over the existing mirror based systems. First, a system of the present invention greatly reduces complexity by eliminating the beamwalk mirrors, the processors, the control circuitry, the servo mechanism, the beamwalk laser source, and the beam transport tube. In addition, with a sufficiently long and loosely strung fiber between the benches, bench motion of much higher magnitude is tolerated than would be allowable with the old, beamwalk mirror pair and beam tube containment system.

According to one aspect of the invention, a system of the present invention eliminates the control feedback loop mechanism of the existing state-of-the-art systems. Since the optical fibers offer effectively instantaneous temporal response, the residual beam jitter is effectively eliminated. The present invention also provides a virtually unlimited dynamic range for bench and laser misalignments in contrast to very restricted ranges for the existing approach.

Other additional advantages of the present invention include reduced weight and reduced frequency of failure due to greatly reduced number of parts. Moreover, since optical fibers are passive devices, the beamwalk maintenance system of the present invention has zero power consumption. Thus, the present invention affords reduced cost, reduced performance and operational risks, and greater serviceability.

According to another aspect of the invention, for illuminator laser systems, which employ high power single mode lasers, the beam containment and beamwalk maintenance system of the present invention is made possible by utilizing high power single mode optical fibers such as the recently developed airguiding photonic bandgap fibers.

A critical design issue in any complex optical system is maintenance of line-of-sight alignment and beam containment in the presence of mechanical and/or thermal disturbances. Recent advances in fiber optics can provide beam containment and beamwalk maintenance capabilities with greater range of correctability, with zero residual jitter, with lower risk of loss of beam containment, and with much fewer components.

Figure 2:
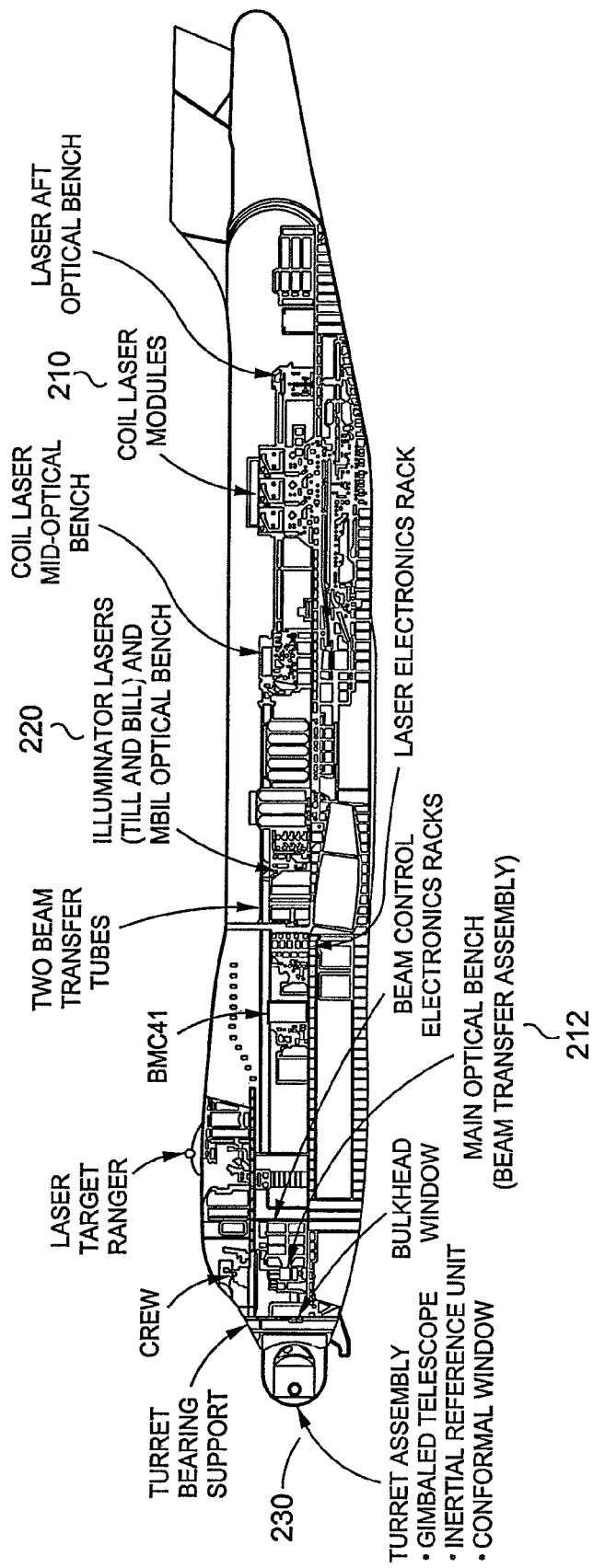
FIG. 2 illustrates an exemplary weapon system having an Airborne Laser system according to one aspect of the present invention.

FIG. 2 illustrates an exemplary weapon system having an Airborne Laser (ABL). As shown in FIG. 2, a Boeing 747-400F freighter aircraft is outfitted with a kill laser, a chemical oxygen iodine laser (COIL) (210), in the rear two-thirds of the aircraft. The multi mega-Watt (MW) output beam of the COIL kill laser (210) is transported to the forward Beam Transfer Assembly (BTA) main optical bench (212) through a helium-filled beam transport tube. In addition to the COIL kill laser (210), FIG. 2 shows a second laser system used for illuminator lasers (220), located in the middle section of the aircraft. The illuminator laser beams are also sent forward to main optical bench (212) through a second helium-filled tube, running parallel to the transport tube for COIL beams. After the beams are processed, they are then transported through yet another tube to the forward Turret Assembly (TA) (230) where they are expanded and directed out through the hemispherical Conformal Window (CW) to a distant target.

For the illuminator laser to be effective as a target illuminating system, it is essential that the focal spot of the laser beam on the target remain stationary or "jitter-free." However, modern aircraft are designed to be flexible as a means to avoid metal fatigue over their lifetime. In case of Boeing 747-400F, the aircraft droops by about one foot when the plane is airborne. Hence, a laser beam, correctly centered on mirrors at the rear and front of the airplane while on the ground, would hit much off center on the forward mirror as the rear mirror is tilted by the droop of the rear fuselage in flight. The problem is compounded by various additional mechanical and thermal disturbances present in the airplane platform during flight.

Figure 1:
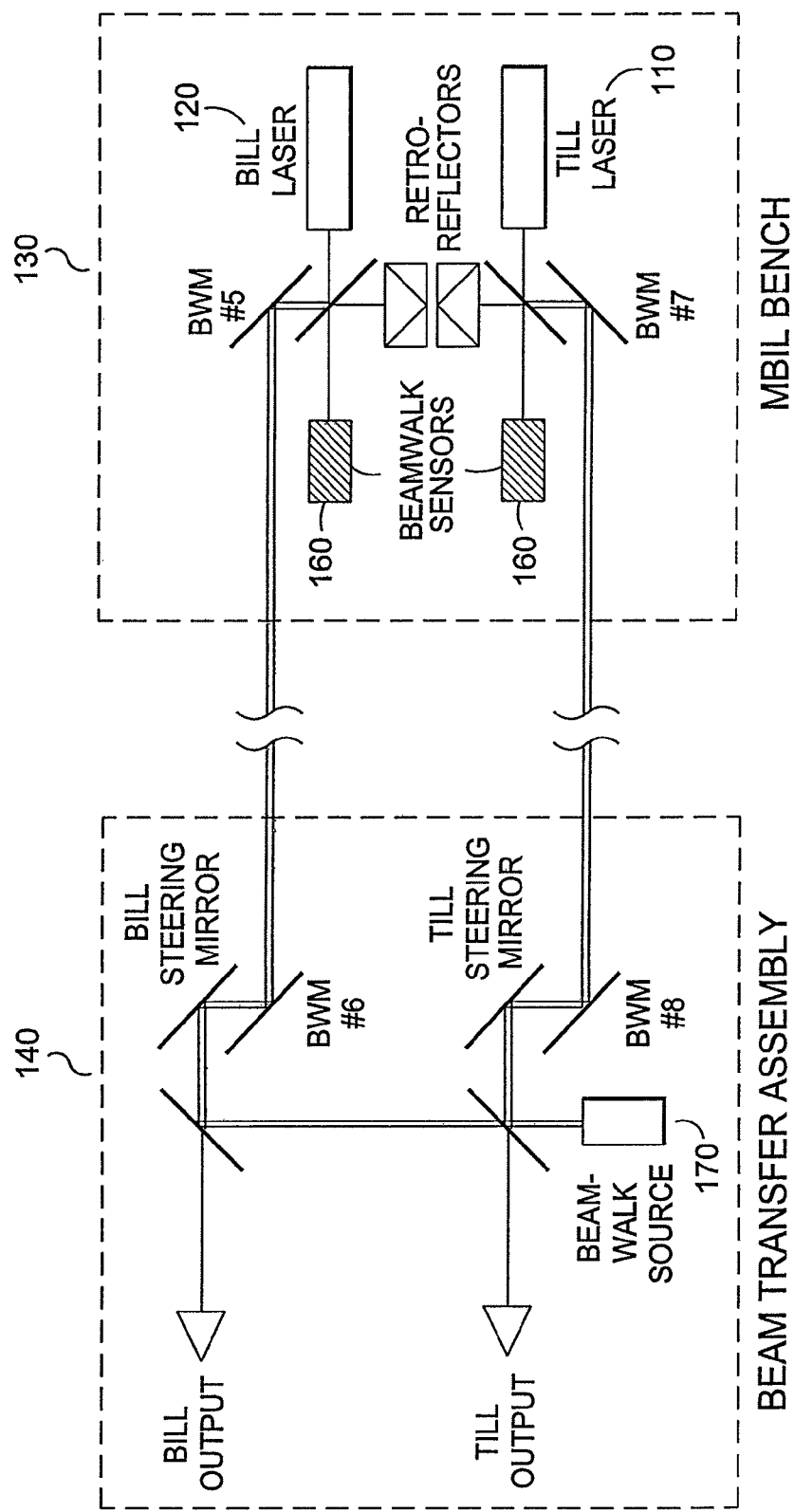
FIG. 1 illustrates a beamwalk maintenance system.
Figure 3:
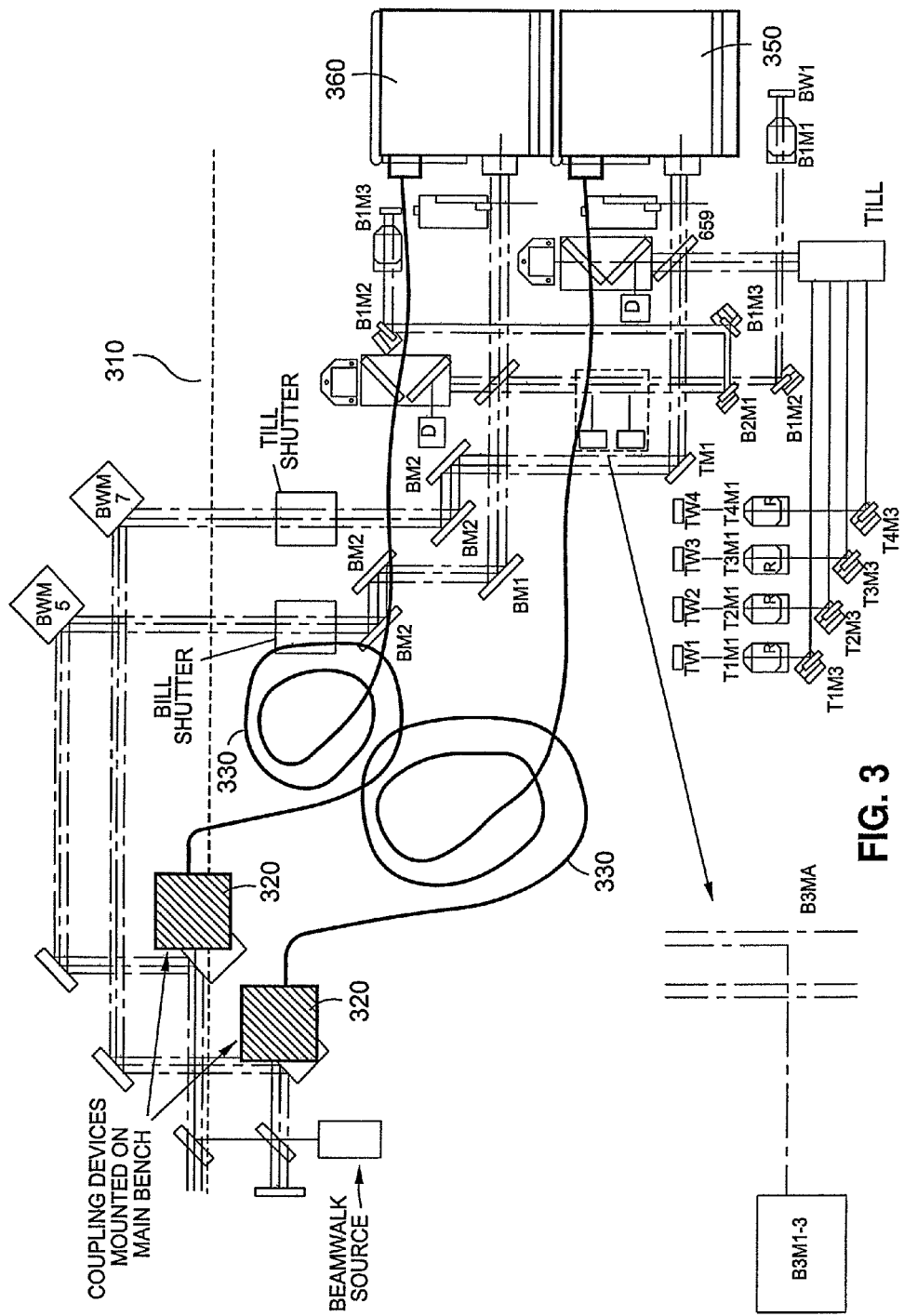
FIG. 3 illustrates an exemplary weapon system for beam containment and beamwalk maintenance according to one aspect of the present invention.

In one aspect of the invention, the present invention is a system and apparatus for beam containment and beamwalk maintenance utilizing optical fibers. FIG. 3 shows an example of an improved and simplified system for beam containment and beamwalk maintenance utilizing optical fibers overlaid on top of the existing mirror based beamwalk maintenance system for an Airborne Laser system. Mirror based beamwalk maintenance system (310) shown in FIG. 3 is a detailed illustration of the same system shown in FIG. 1 and discussed above. As shown in FIG. 3, the present invention provides a simplified beamwalk maintenance and beam containment system by connecting a target tracking illuminator laser (350) and a beacon illuminator laser (360) to optical coupling devices (320) with optical fibers (330). Reduction in complexity in beamwalk maintenance system can be immediately appreciated by those skilled in the art. The present invention also provides beam containment by transporting laser beams via optical fibers (330).

Optical fibers (330) are rigidly coupled to the outputs of target tracking illuminator laser (350) and beacon illuminator laser (360) and rigidly attached (or clamped) to optical coupling devices (320) which are in turn hard-mounted to the main optical bench. Because the laser beams are contained within optical fibers (330), the line-of-sight alignment of the laser beams is maintained without complex system of active mirrors and control electronics. Relative bench and laser motions, as well as the drift of the beams for any reason have no effect on the directions of the fiber output beams, since they are determined simply by the fiber ends that are securely fastened to the main optical bench. Thus, the beamwalk mirrors, the processors, the control circuitry, the servo mechanism, the beamwalk laser source, the retroreflectors, and the beam transport tube and its fill gas are all eliminated by the vastly simplified system of the present invention.

The target tracking illuminator laser and the beacon illuminator laser of the Airborne Laser system (ABL) discussed above may be high power lasers with at least kilo-Watt (kW) output power range because the ABL needs to focus on targets that may be more than 100 kilometers (km) away. The present invention, however, is not limited to this example, and the present invention may employ lower or higher power lasers.

Figure 4:
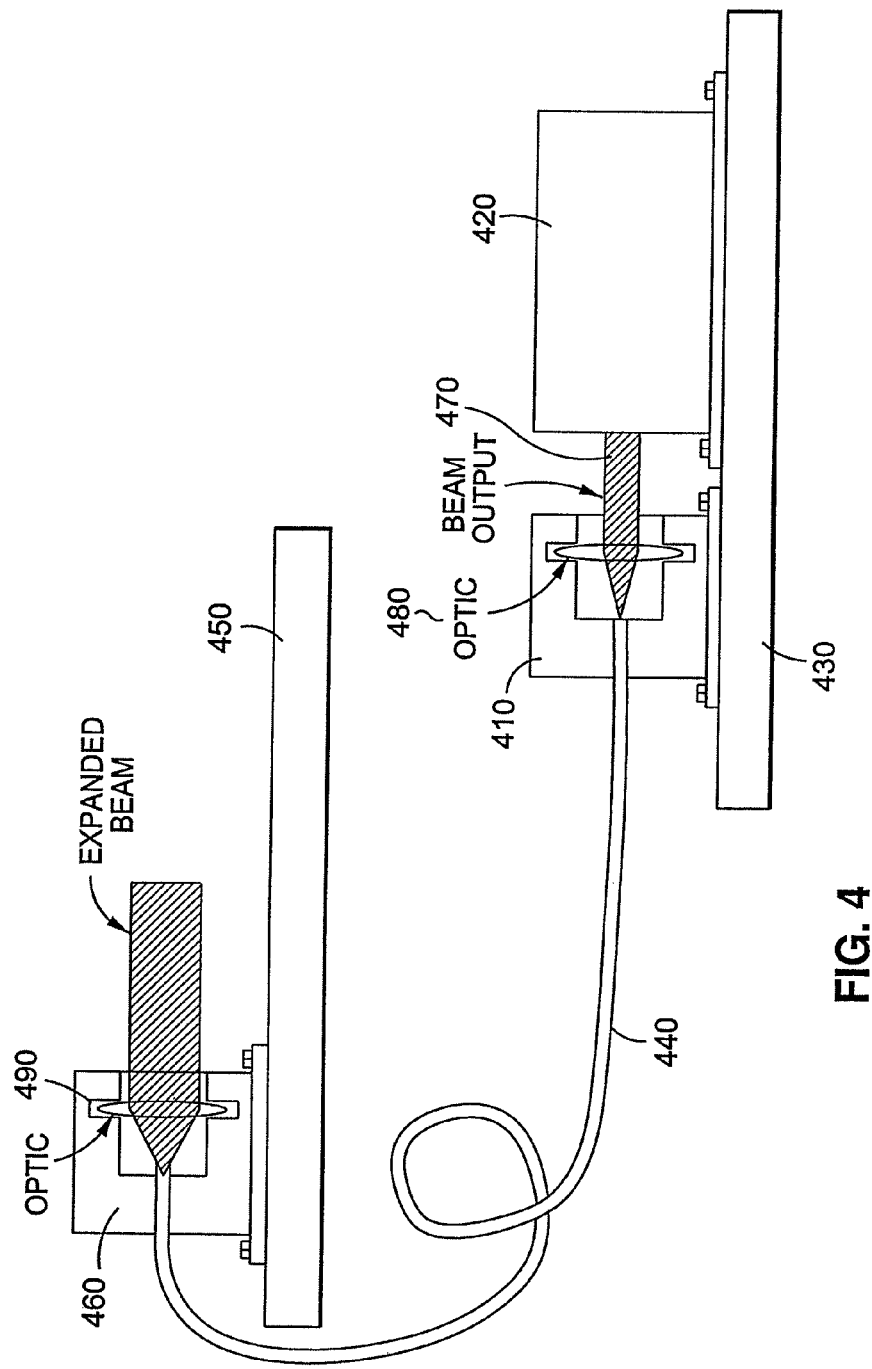
FIG. 4 illustrates an exemplary embodiment of a weapon system for beam containment and beamwalk maintenance according to one aspect of the present invention.

FIG. 4 illustrates an exemplary embodiment of an apparatus for beam containment and beamwalk maintenance according to one aspect of the present invention. As shown in FIG. 4, first optical coupling device (410) is coupled to high power laser source (420). Both first optical coupling device (410) and laser source (420) are hard-mounted to first optical bench (430). High power optical fiber (440) is "clamped" to first optical bench (430) and high power laser source (420) by having one end of the fiber rigidly attached to first optical coupling device (410) which is in turn hard-mounted onto first optical bench (430). The other end of optical fiber (440) is similarly clamped to second optical bench (450) by being rigidly attached to second optical coupling device (460) which is hard-mounted onto second optical bench (450). Thus, optical fiber (440) optically connects first optical coupling device (410) and second optical coupling device (460), transporting the high power laser beam from first optical bench (430) to second optical bench (450). Optical fiber (440) is also referred to as transfer optical fiber. Rigid attachment of transfer optical fiber (440) to optical coupling devices and hard-mounting of the optical coupling devices onto the optical benches ensure line-of-sight or beamwalk alignment between the optical benches. In one embodiment of the present invention, output laser beam (470) of high power laser source (420) can be focused into transfer optical fiber (440) by way of optics (480) placed in first optical coupling device (410). Similarly, the laser beam can be expanded at second optical bench (450) by optics (490) placed in second optical coupling device (460), and sent forward to downstream optics.

Laser source (420) can be any high power laser known to those skilled in the art, including, but not limited to, illumination lasers for a weapon system such as a directed energy system, and a target tracking illuminator laser and a beacon illuminator laser of an Airborne Laser system, without departing from the scope of the present invention. The present invention, however, is not limited to these examples.

Optical fiber (440) can be any high power optical fiber known to those skilled in the art without departing from the scope of the present invention. In one embodiment, the present invention employs single mode high power optical fibers for transfer optical fiber (440). For the Airborne Laser (ABL) system example above, the target tracking illuminator laser and the beacon illuminator laser are single mode lasers because multi-mode lasers cannot be focused over the operational range of ABL—which can be distances exceeding 100 kilometers. Thus, an optical fiber based beam containment and beamwalk maintenance apparatus for ABL illuminator lasers requires single mode fibers that can transport single mode laser beams in addition to being capable of transporting high power beams at, for example, kilo-Watt power range.

Figure 5B:
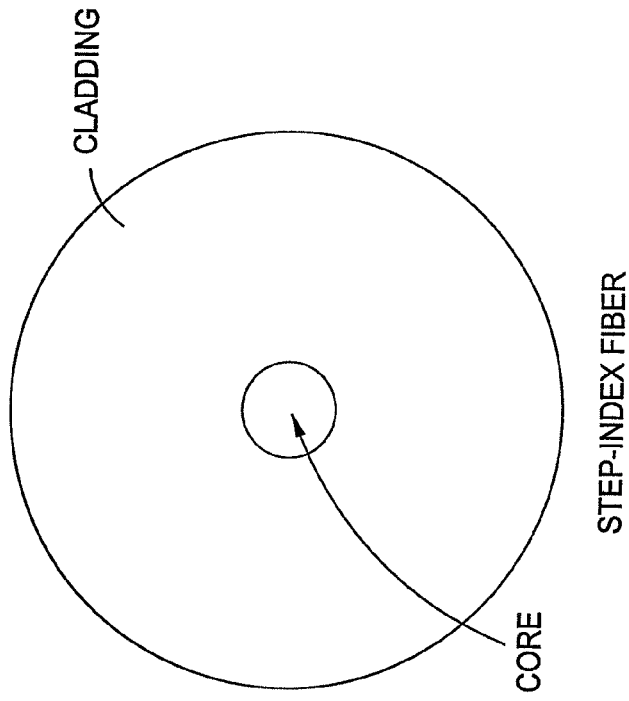
FIG. 5b illustrates a cross-sectional view of an exemplary step-index fiber.
Figure 5A:
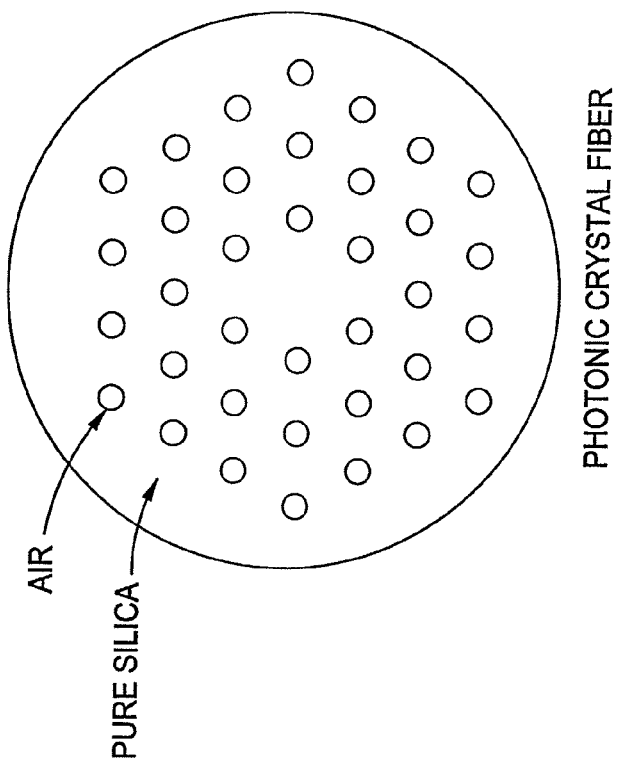
FIG. 5a illustrates a cross-sectional view of an exemplary photonic crystal fiber.

Such optical fibers are now available because of recent advances in fiber optics technology. For example, recently developed airguiding photonic bandgap fibers or air-clad photonic crystal fibers can be made to transport high power single mode laser beam. Briefly, these new fibers utilize multiple holes filled with air or gas within pure silica material to achieve the desired properties. FIG. 5a illustrates a cross-section of a photonic crystal fiber as compared to a standard step-index fiber illustrated in FIG. 5b. For a description of the operation and properties of the photonic crystal fibers, see, "Air-clad large-mode-area photonic crystal fibers: power scaling concepts up to the multi kW-range," by A. Liem et al., Friedrich Schiller University Jena, Institute of Applied Physics, Germany. See also, "Air-clad photonic crystal fibers for high-power single-mode lasers," by Jes Broeng et al., Crystal Fibre A/S, and, in general, www.crystal-fibre.com.

Typical exemplary specifications for the optical fibers for ABL illuminator lasers are given in Table 1.

TABLE 1

| Fiber type | Airguiding Photonic Bandgap Fiber |
|---|---|
| Material | Pure Silica |
| Cladding Diameter | 130 μm |
| Coating Diameter | 250 μm |
| Coating Material | Acrylate |
| Core Size | 12 μm |
| Power Capability | >1 kW |
| Attenuation | <0.1 db/m |
| Bandwidth | ~100 nm |
| Center Wavelength of Target Tracking Illuminator Laser | 1.030 μm |
| Center Wavelength of Beacon Illuminator Laser | 1.064 μm |
| Numerical Aperture | ~0.1 |
| Polarization | Maintaining |
| Mode Capability | Single Transverse |
| Core Gas Fill | He or vacuum |
| Bend Sensitivity | None |

However, the present invention is not limited to optical fibers with these parameters, as many other types of fibers may be used without departing from the scope of the present invention. For applications where single mode high power laser is called for, the present invention contemplates utilizing any single mode high power optical fibers known to those skilled in the art.

For the target tracking illuminator laser and the beacon illuminator laser of an Airborne Laser system, the output of laser source (420) comprises multiple beamlets according to one aspect of the present invention. Multi-beam illuminator lasers provide uniform laser beam illumination of a distant target in the presence of changing atmospheric conditions by utilizing multiple co-parallel, mutually incoherent, polarization-aligned beamlets. A detailed description of a multi-beam illuminator laser system is provided in U.S. Pat. No. 5,734,504, "Multi-beam Illuminator Laser," by Kenneth W. Billman, filed Dec. 5, 1996, which is incorporated by reference herein in its entirety. For a multi-beam illuminator laser system, transfer optical fiber (440) of the present invention comprises multiple fibers, one fiber for each beamlet. Where maintaining or preserving beamlet polarization is required, transfer optical fiber (440) of the present invention comprises polarization maintaining optical fibers.

In yet another embodiment, the present invention employs a laser with a direct fiber output. When a laser with a direct fiber output is used for laser source (420), it is not necessary to resort to a hard-mounted optical coupling device in order to clamp or rigidly attach the transfer optical fibers to optical bench. Rather, all that is needed is fiber-to-fiber splice to attach the transfer fiber to the output fiber of the laser source. For lasers with a direct fiber output, fiber-to-fiber splice effectively operates as a rigid attachment optical coupling device.

Figure 6:
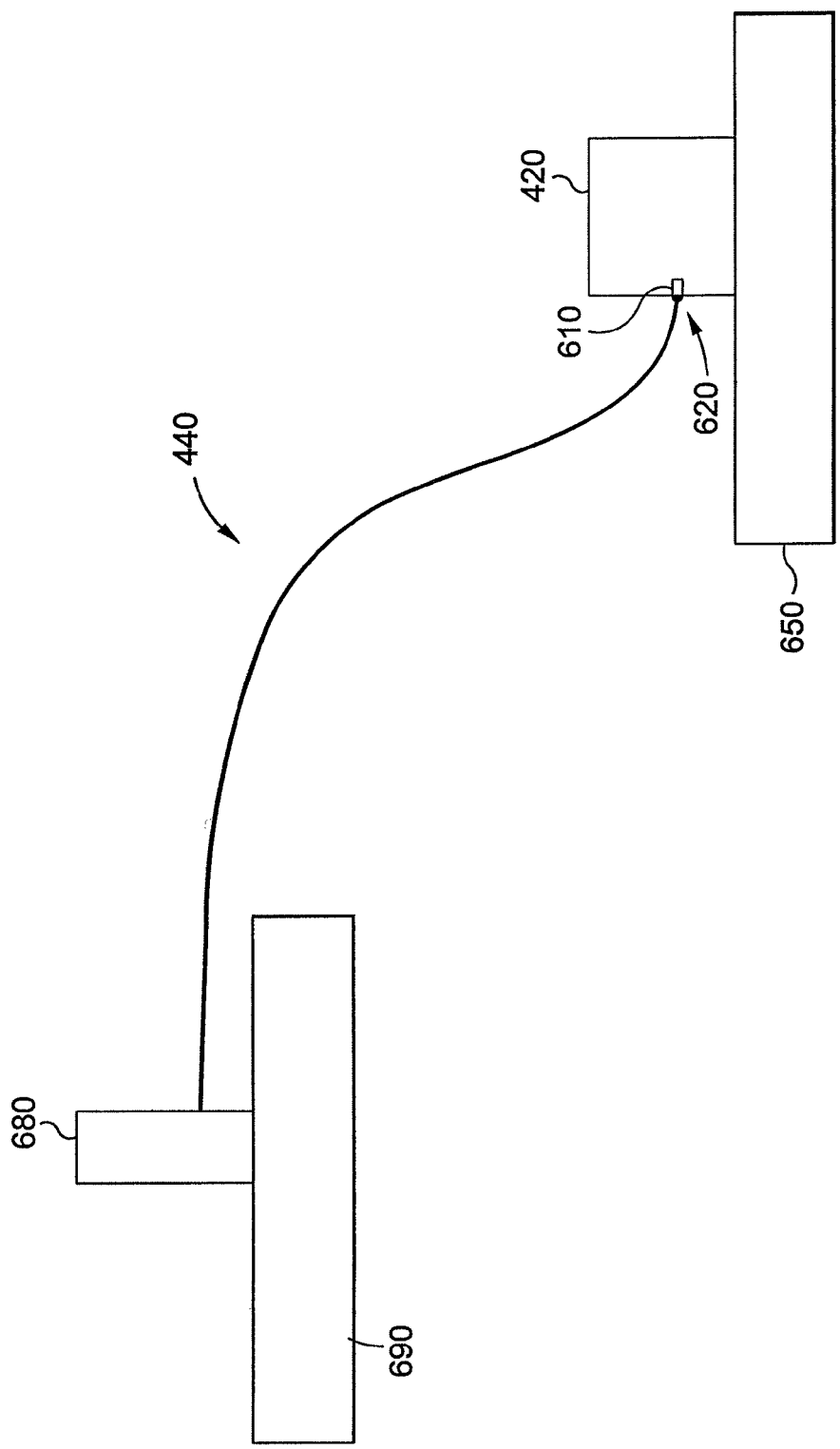
FIG. 6 is an exemplary illustration of a transfer optical fiber coupled to an output fiber of a laser with a direct fiber output according to one aspect of the present invention.

FIG. 6 illustrates a transfer optical fiber coupled to an output fiber of a laser with a direct fiber output according to one aspect of the present invention. As shown in FIG. 6, laser source (420), mounted on optical bench (650), has a direct fiber output with output fiber (610) which is coupled or attached to transfer optical fiber (440) with fiber-to-fiber splice (620). Transfer optical fiber (440) continues to a fiber mount (680) on optical bench (690). Fiber-to-fiber splice (620) can be any suitable optical fiber joint known to those skilled in the art, including, but not limited to, a simple butt joint, an optically-wetted joint, and a fused glass joint, without departing from the scope of the present invention. Transfer optical fiber 440 can be mounted In yet another aspect of the invention, the present invention is a high power illuminator laser system utilizing high power single mode optical fibers. The high power illuminator laser system of the present invention can be an illuminator laser system for any weapon systems such as Directed Energy (DE) systems, including, but not limited to, the Airborne Laser system, the Advanced Tactical Laser (ATL) mounted in a C130 aircraft or a helicopter, the Joint Strike Fighter (JSF) Laser, the aerostat-supported lasers, and the Space Based Lasers (SBL) with Relay Mirrors, without departing from the scope of the present invention. All of these systems require high power illuminator lasers for targeting the Directed Energy beams, and need to place their illuminator lasers on vibrating, flexible platforms, which are subject to mechanical and thermal disturbances. For these systems, the present invention provides high power illuminator lasers with zero residual jitter and a tolerance to much greater mechanical and thermal disturbances than existing mirror based solutions. Reduced weight of the present invention is also beneficial for airborne or space-based DE systems. Zero power consumption of the beamwalk maintenance system of the present invention is particularly beneficial for systems with scarce power reserves such as the Space Based Lasers. In general, the present invention affords reduced cost, reduced performance and operational risks, reduced frequency of failure, and greater serviceability by utilizing optical fibers for beamwalk maintenance and beam containment.

The present invention relates to advanced weapon systems, and particularly to weapon system illuminator laser systems. By way of illustration, advanced weapon systems that need to actively track a target, such as a missile, a satellite, a tank, a person, etc., may send one or more laser beams to the target to illuminate it so that the target's image may be seen by the weapon system sensors. It should be noted that the term "beam" or "beams" may refer to a "beamlet" or "beamlets" and vice versa.

Figure 7:
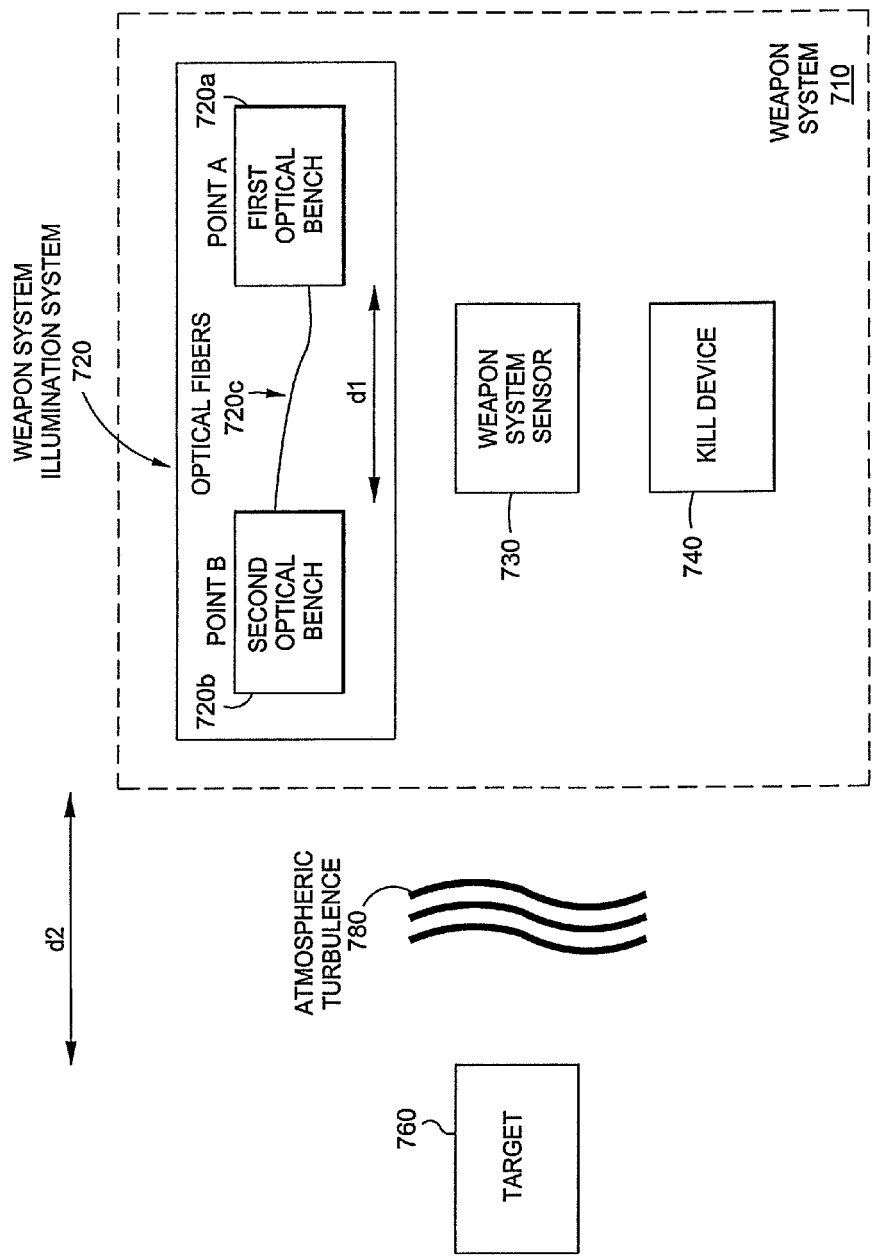
FIG. 7 illustrates an exemplary weapon system according to one aspect of the present invention.

FIG. 7 illustrates an exemplary weapon system according to one aspect of the present invention. A weapon system (710) includes a weapon system illumination system (720), a weapon system sensor (730), and a kill device (740). Weapon system (710) may be, by way of illustration and not limitation, an aircraft, a satellite, a mobile ground vehicle, or a ship. In another aspect, weapon system (710) may be a weapon, another type of vehicle, or another type of system or device having a weapon. Weapon system illumination system (720) may include a first optical bench (720a) at point A, a separate second optical bench (720b) at point B, and one or more optical fibers (720c). First optical bench (720a) is sometimes referred to as an "illuminator laser bench," a "laser optical bench," or a "laser bench." Second optical bench (720b) is sometimes referred to as an "adaptive optical bench," a "receiving optical bench," or a "main optical bench." According to one example, the distance (d1) between first optical bench (720a) and second optical bench (720b) is in the range of 10-20 meters or larger. The present invention, however, is not limited to this example. In other examples, the distance (d1) may be smaller (e.g., 1-10 meters, 0.1-1 meter, or any other range).

Weapon system illumination system (720) may mount its laser(s) on first optical bench (720a). Second optical bench (720b) can accept the beam(s) from first optical bench (720a) and prepare them for launch toward an object such as a target (760) or atmospheric turbulence (780) either directly or through another beam director stage. Atmospheric turbulence (780) is located in front of target (760), between target (760) and weapon system (710). In most cases, first optical bench (720a) at point A and second optical bench (720b) at point B may be subject to different mechanical or thermal disturbances (e.g., different environmental conditions of mechanical vibration, acceleration, displacement, acoustics, and thermal stress). Hence, first optical bench (720a) and second optical bench (720b) may vary in spatial relation.

Weapon system illumination system (720) may produce one or more weapon system illuminator laser beams to illuminate and track one or more objects such as target (760) and/or atmospheric turbulence (780) without destroying the objects. Weapon system sensor (730) can receive one or more return beams from the illuminated objects and interrogate the images of the objects.

Weapon system (710) may use kill device (740) to produce enough energy to destroy or damage target (760). Kill device (740) may be, by way of illustration and not limitation, a high energy laser producing, for example, multi mega-Watt output beams. In other examples, kill device (740) may be configured to launch missiles, bullets, or other types of weapons that can destroy or damage target (760). Weapon system (710) may use the beam(s) illuminating atmospheric turbulence (780) to interrogate the condition of the atmospheric turbulence in front of target (760) and may make adjustments to the trajectory of the beams (or other forms of energy) launched by kill device (740).

According to one example, the distance (d2) between weapon system (710) and target (760) is in the range of 100 kilometers or greater. The present invention, however, is not limited to this example. In other examples, the distance (d2) may be smaller (e.g., 100-900 meters, 10-100 meters, 1-10 meters, or any other range).

One aspect of the invention relates to a weapon system and method for containing one or more weapon system illuminator laser beams and for providing beamwalk maintenance. For example, a weapon system can contain one or more illuminator laser beams as they move from its laser source (e.g., point A in FIG. 7) to its reception (e.g., point B in FIG. 7) in the optical system (e.g., keeping the beams under control and hence not allowing them to impinge on any unwanted surfaces). The weapon system may also provide beamwalk maintenance (e.g., insuring that the beams arrive at point B precisely on center and with the correct input angle) despite the presence of large mechanical or thermal disturbances (e.g., large environmental disturbances such as mechanical vibration, acceleration, displacement, acoustics, and thermal stress) to the optical fiber endpoints mounted at point A and point B as well as to the region between them. The optical fibers, their endpoints at point A and point B, a weapon system illuminator laser system at point A, and the optical system at point B are configured to withstand the mechanical and/or thermal disturbances.

FIG. 8*a* illustrates an exemplary weapon system for beam containment and beamwalk maintenance according to one aspect of the present invention. A weapon system illumination system (810) includes a weapon system illuminator laser system (820). Weapon system illuminator laser system (820) includes a weapon system illuminator laser (820*b*) and may further include a first optical bench (820*a*). Weapon system illuminator laser (820*b*) can be mounted on first optical bench (820*a*) and configured to produce multiple output beams.

Weapon system illumination system (810) further includes optical fibers (840), one end of which can be anchored at first optical bench (820*a*) and the other end of which can be anchored at a second optical bench (830*a*). Optical fibers (840) can receive the output beams from weapon system illuminator laser system (820). Each optical fiber (840) can transport a corresponding one of the output beams to second optical bench (830*a*). Beams (835) can be directed using a beam director stage, including, for example, a secondary mirror (860) and a primary mirror (850). Beams (865) from primary mirror (850) can be sent to and focused at a target (890).

A configuration of the invention that utilizes multiple beams allows primary mirror (850) to have small beam circles, rather than a full-aperture beam, and allows primary mirror (850) to provide overlapping beams on target (890). This results in excellent illumination uniformity on target (890). In one example, an array of small incoherent beams or beamlets, which replace a single coherent beam, can minimize intensity variation of illumination at the target. Multiple low power beams (865) propagated to target (890) through atmospheric turbulence (870) can provide a smoother illumination pattern at the target than a single beam having the same total power when propagated to target (890) through atmospheric turbulence (870). A sum of uncorrelated, non-uniform (scintillated) beams can provide smoother total target illumination. An exemplary configuration of the invention allows laser beams to be transported within weapon system illumination system (810) while maintaining beam control, beam modal quality and beam polarization control. As will be explained further later, beams (865) can be sent to and focused at a location in front of target (890), such as atmospheric turbulence (870).

In FIG. 8*a*, according to one aspect of the invention, weapon system illuminator laser (820*b*) may include at least one target tracking illuminator laser configured to produce one or more weapon system target tracking illuminator laser beams. These laser beams may illuminate and track target (890) without destroying the target. These laser beams also do not damage or heat the target according to one aspect of the invention.

According to another aspect of the invention, weapon system illuminator laser (820*b*) may include at least one beacon illuminator laser configured to produce one or more weapon system beacon illuminator laser beams. These laser beams may illuminate and track objects such as atmospheric turbulence (870) that is near or in front of target (890) without destroying the atmospheric turbulence. These laser beams also do not damage or heat the atmospheric turbulence according to one aspect of the invention.

According to yet another aspect of the invention, weapon system illumination system (810) may include one system for target tracking illumination and another system for beacon illumination. The system for target tracking illumination may include items (820), (840), (830*a*), (850), (860), and the components thereof. The system for target tracking illumination can be used to illuminate and track target (890). The system for beacon illumination may include similar items (not shown) as those for target tracking illumination, and the system for beacon illumination can be used to illuminate and track areas near target (890), such as atmospheric turbulence (870).

Now referring to FIG. 8*b*, weapon system illuminator laser (820*b*) can be a multi-beam weapon system illuminator laser, which can include a laser (892), a spatial filter and beam expander (893), and a beam divider (894). Laser (892) can generate a coherent, polarized light beam. Spatial filter and beam expander (893) can adjust the beam waist from laser (892) to be centered in beam divider (894), which can produce multiple output beams (895).

According to one example, the total combined power of multiple output beams (895) is in the range of at least a kilo-Watt (kW) or greater. Thus, the power of each of the output beams is much less than a kilo-Watt. The power of each beam is the total combined power divided by the number of beams. An optical fiber carrying a beam only needs to have enough power capability to support just that one beam. Therefore, when a configuration of the invention utilizes multiple optical fibers for multiple beams, the required power capability of each optical fiber is lowered (e.g., the total combined power divided by the number of optical fibers). For instance, if a system utilizes 50 optical fibers and the total combined power is a kilo-Watt, then the power capability of each optical fiber can be as low as 20 Watts. If the total combined power is in the range of a kilo-Watt or greater, then weapon system illuminator laser (820*b*) may have a kilo-Watt or higher output power range.

The present invention, however, is not limited to the above example. In other examples, the total combined power can be less than a kilo-Watt (e.g., 100-900 Watts, 10-100 Watts, 1-10 Watts, a fraction of a Watt, or any other power range). If multiple beams are utilized, then the power of each beam can also be much smaller. Furthermore, optical fibers having lower power capability and weapon system illuminator laser (820*b*) having lower output power range can be utilized.

The present invention may be practiced utilizing various configurations. For example, referring back to FIG. 4, according to one aspect of the invention, a weapon system may have weapon system illuminator laser (420) and first optical coupling device (410) mounted on first optical bench (430) and second optical coupling device (460) mounted on second optical bench (450). Optical fiber 440 may be attached to optical coupling devices (410) and (460). Referring back to FIG. 6, in another aspect of the invention, weapon system illuminator laser (420) mounted on first optical bench (650) may have direct fiber output (610). Optical fiber (440) may be coupled to direct fiber output (610) and attached to fiber mount (680) at second optical bench (690).

Figure 9:
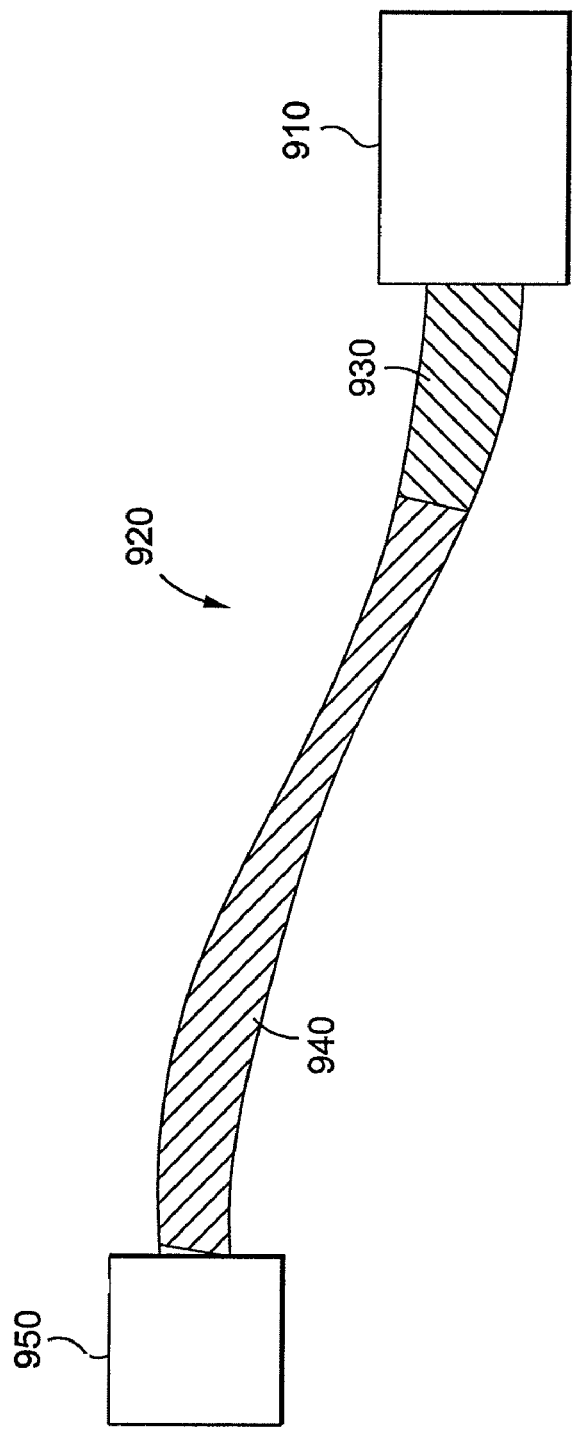
FIG. 9 illustrates an exemplary weapon system for beam containment and beamwalk maintenance according to another aspect of the present invention.

Now referring to FIG. 9, according to yet another aspect of the invention, a weapon system fiber illuminator laser (920) may be utilized. Weapon system fiber illuminator laser (920) includes a pumping and lasing region (930) and an un-pumped and non-lasing region (940). Pumping and lasing region (930) is located at a first optical bench (910), and un-pumped and non-lasing region (940) extends from first optical bench (910) to second optical bench (950).

Each of the exemplary configurations illustrated above (e.g., FIGS. 4, 6, 7, 8a and 9) can utilize one optical fiber and one illuminator laser. In another aspect, each configuration can utilize multiple optical fibers. The multiple optical fibers can be configured to transport multiple beams produced by a single laser (e.g., multiple beams produced using a beam divider as shown in FIG. 8b) or configured to transport multiple beams produced by multiple lasers. In yet another aspect, each configuration can utilize one or more target tracking illuminator lasers. In yet another aspect, each configuration can utilize one or more target tracking illuminator lasers as well as one or more beacon illuminator lasers.

Figure 10A:
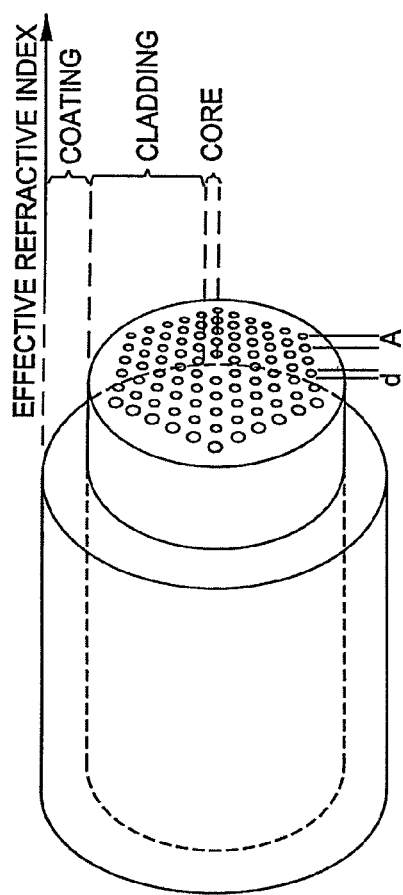
FIG. 10a illustrates an exemplary single mode optical fiber.
Figure 10B:
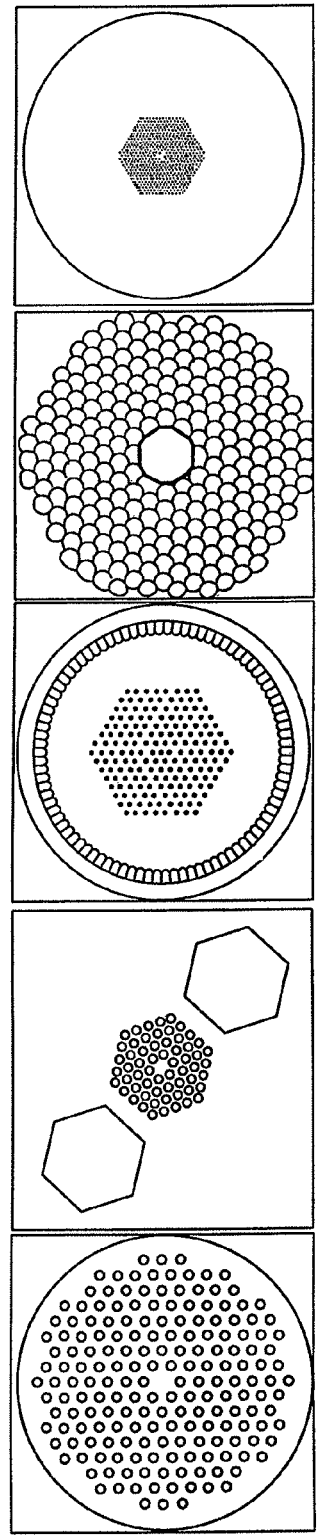
FIG. 10b illustrates cross-sectional views of exemplary optical fibers.

FIG. 10a illustrates an exemplary single mode optical fiber, and FIG. 10b illustrates cross-sectional views of exemplary optical fibers. According to one aspect, an exemplary configuration of the invention utilizes one or more single-mode, polarization maintaining optical fibers. When propagating illuminator beams over hundreds of kilometers, an exemplary configuration of the invention can maintain the single-mode quality and polarization of the beams as they move from a first optical bench to a second optical bench within the weapon system. In another aspect, an exemplary configuration of the invention may utilize one or more multi-mode optical fibers. However, multi-mode optical fibers can scramble the modes and polarization orientations when the distance between the first and second optical benches within the system is tens of meters or greater. In yet another aspect, an exemplary configuration of the invention may utilize one or more non-polarization maintaining optical fibers.

Referring back to FIG. 1, conventionally, a complex system called a Beamwalk Mirror system is used to send and receive beams and to correct for the relative motions of the two optical benches. The conventional system fails when excess relative motion is encountered, or when the power to its computer or mirror control circuits fail. Another conventional system called the Beam Containment system is also used to keep the errant laser beams from damaging other components or operators in the system. Conventional systems are heavy, complex, costly, and not reliable.

The present invention provides various advantages over the conventional systems, such as relieving the advanced military or commercial tracking systems from the weight, volume, cost, complexity, hazard, and fault-prone aspects of the conventional, state-of-art (SoA) Beamwalk and Beam Confinement system.

The present invention can provide significantly better performance over the conventional systems. For example, a configuration of the invention can provide a factor of ten or more in cost and mass reduction. A configuration of the invention can tolerate larger environmental disturbances. The invention can control the beams instantaneously rather than being delayed by a control loop. A beam transport mechanism of the invention requires no electrical power. A configuration of the invention can occupy negligible volume compared to the conventional systems. Furthermore, a configuration of the invention may withstand G-loads that are in excess of those (about 10 maximum) that can be withstood by the conventional systems. This is because optical fibers utilized by the invention are significantly reduced in mass than the conventional components, have no moving parts or linkages, and have no mechanical resonances. Moreover, a configuration of the invention provides excellent safety characteristics because optical fibers, as utilized in the invention, are completely passive and not subject to reliability failures of the actively driven conventional systems.

The foregoing description of the invention has been presented for the purposes of illustration and description. It is not intended to be exhaustive or to limit the invention to the precise form disclosed. Many modifications and variations are possible in light of the above teaching. It is intended that the scope of the invention is not limited by this detailed description, but by the claims and the equivalents to the claims appended hereto, wherein reference to an element in the singular is not intended to mean "one and only one" unless specifically so stated, but rather "one or more." Unless specifically stated otherwise, the term "some" refers to one or more.

It is understood that the specific order or hierarchy of steps in the methods disclosed is an illustration of exemplary approaches. Based upon design preferences, it is understood that the specific order or hierarchy of steps in the methods may be rearranged. Some of the steps may be performed simultaneously. The accompanying method claims present elements of the various steps in a sample order, and are not meant to be limited to the specific order or hierarchy presented.

What is claimed is:

1. A subsystem of a weapon system, comprising:
  a weapon system illuminator laser system configured to produce one or more weapon system illuminator laser beams to illuminate at least one object outside the weapon system without destroying the at least one object, the weapon system illuminator laser system located at a first location within the weapon system, wherein the at least one object or a second object associated with the at least one object is to be destroyed or damaged by an energy force; and
  one or more optical fibers coupled to the weapon system illuminator laser system, the one or more optical fibers configured to transport the one or more weapon system illuminator laser beams from the first location to a second location within the weapon system, the one or more optical fibers configured to provide beam containment and beamwalk maintenance in the presence of mechanical or thermal disturbances, the one or more optical fibers and the weapon system illuminator laser system configured to withstand mechanical or thermal disturbances.

2. The subsystem according to claim 1, wherein the weapon system illuminator laser system comprises at least one target tracking illuminator laser configured to produce one or more weapon system target tracking illuminator laser beams to illuminate and track the at least one object outside the weapon system without destroying the at least one object,
wherein a target is the at least one object to be destroyed or damaged by the energy force.

3. The subsystem according to claim 1, wherein the weapon system illuminator laser system comprises at least one beacon illuminator laser configured to produce one or more weapon system beacon illuminator laser beams to illuminate the at least one object outside the weapon system without destroying the at least one object,
wherein the at least one object comprises atmospheric turbulence located between (i) a target to be destroyed or damaged by the energy force and (ii) the weapon system,
wherein the target is the second object associated with the at least one object.

4. The subsystem according to claim 1, further comprising:
a weapon system sensor configured to receive one or more return beams from the at least one object outside the weapon system and to interrogate an image from the at least one object.

5. The subsystem according to claim 1,
wherein the weapon system illuminator laser system comprises:
a first optical bench at the first location;
at least one weapon system illuminator laser mounted on the first optical bench; and
at least a first optical coupling device mounted on the first optical bench, the at least first optical coupling device coupled to the at least one weapon system illuminator laser and to the one or more optical fibers,
wherein the weapon system further comprises:
a second optical bench at the second location; and
at least a second optical coupling device mounted on the second optical bench, the at least second optical coupling device attached to the one or more optical fibers.

6. The subsystem according to claim 1,
wherein the weapon system illuminator laser system comprises:
a first optical bench at the first location; and
at least one weapon system illuminator laser mounted on the first optical bench, the at least one weapon system illuminator laser having one or more direct fiber outputs attached to one end of the one or more optical fibers,
wherein the weapon system further comprises:
a second optical bench at the second location; and
a fiber mount mounted on the second optical bench, wherein a second end of the one or more optical fibers is attached to the fiber mount.

7. The subsystem according to claim 1, comprising:
a first optical bench at the first location;
a second optical bench at the second location; and
at least one weapon system fiber illuminator laser including a pumping and lasing region and an un-pumped and non-lasing region,
wherein the pumping and lasing region of the at least one weapon system fiber illuminator laser is located in the weapon system illuminator laser system at the first location, and
wherein the un-pumped and non-lasing region of the at least one weapon system fiber illuminator laser is located in the one or more optical fibers extending from the first location to the second location.

8. The subsystem according to claim 1, wherein the weapon system does not include a beamwalk minor, a processor, control circuitry, a servo mechanism, or a beam transport tube to transport the one or more weapon system illuminator laser beams from the first location to a second location.

9. The subsystem according to claim 1, wherein the one or more optical fibers include a plurality of fibers,
wherein the one or more weapon system illuminator laser beams include a plurality of weapon system illuminator laser beams, and
wherein each of the plurality of fibers is configured to transport a corresponding one of the plurality of weapon system illuminator laser beams.

10. The subsystem according to claim 1, further comprising:
a kill device configured to produce the energy force to destroy or damage a target, wherein the target is the at least one object or the second object associated with the at least one object.

11. The subsystem according to claim 1, wherein the one or more optical fibers are single-mode one or more optical fibers, and the one or more weapon system illuminator laser beams are single-mode one or more weapon system illuminator laser beams.

12. The subsystem according to claim 1, wherein the one or more optical fibers are one or more polarization maintaining optical fibers.

13. The subsystem according to claim 1, wherein the one or more optical fibers are one or more airguiding photonic bandgap fibers.

14. The subsystem according to claim 1, wherein the weapon system illuminator laser system comprises a multi-beam weapon system illuminator laser.

15. The subsystem according to claim 1, wherein the weapon system illuminator laser system comprises a multi-mode weapon system illuminator laser.

16. The subsystem according to claim 1, wherein the weapon system is included in a ground-based weapon system or an airborne weapon system.

17. A method utilized by a subsystem of a weapon system, comprising:
generating, by a weapon system illuminator laser system, one or more weapon system illuminator laser beams to illuminate at least one object outside the weapon system without destroying the at least one object, the weapon system illuminator laser system located at a first location within the weapon system, wherein the at least one object or a second object associated with the at least one object is to be destroyed or damaged by an energy force;
transporting, by one or more optical fibers, the one or more weapon system illuminator laser beams from the first location to a second location within the weapon system, wherein the step of transporting comprises:
providing beam containment and beamwalk maintenance in the presence of mechanical or thermal disturbances; and
withstanding mechanical or thermal disturbances by the one or more optical fibers and the weapon system illuminator laser system.

18. The method according to claim 17, wherein the step of generating comprises:
generating, by at least one target tracking illuminator laser, one or more weapon system target tracking illuminator laser beams to illuminate and track the at least one object outside the weapon system without destroying the at least one object,
wherein a target is the at least one object to be destroyed or damaged by the energy force.

19. The method according to claim 17, wherein the step of generating comprises:
   generating, by at least one beacon illuminator laser, one or more weapon system beacon illuminator laser beams to illuminate the at least one object outside the weapon system without destroying the at least one object,
   wherein the at least one object comprises atmospheric turbulence located between (i) a target to be destroyed or damaged by the energy force and (ii) the weapon system, wherein the target is the second object associated with the at least one object.

20. The method according to claim 17, further comprising:
   generating, by a kill device, the energy force to destroy or damage a target, wherein the target is the at least one object or the second object associated with the at least one object.

* * * * *